United States Patent
Martin et al.

(10) Patent No.: US 10,773,596 B2
(45) Date of Patent: *Sep. 15, 2020

(54) VEHICLE BATTERY CHARGING SYSTEM AND METHOD

(71) Applicant: FORD GLOBAL TECHNOLOGIES, LLC, Dearborn, MI (US)

(72) Inventors: Douglas Raymond Martin, Canton, MI (US); Erick Michael Lavoie, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1341 days.

This patent is subject to a terminal disclaimer.

(21) Appl. No.: 14/268,000

(22) Filed: May 2, 2014

(65) Prior Publication Data

US 2014/0239891 A1     Aug. 28, 2014

Related U.S. Application Data

(63) Continuation-in-part of application No. 13/553,442, filed on Jul. 19, 2012.

(51) Int. Cl.
*H02J 7/00*     (2006.01)
*B60L 11/18*    (2006.01)
(Continued)

(52) U.S. Cl.
CPC ........... *B60L 11/182* (2013.01); *B60L 3/0023* (2013.01); *B60L 3/04* (2013.01); *B60L 53/12* (2019.02); *B60L 53/30* (2019.02); *B60L 53/36* (2019.02); *B60L 2210/30* (2013.01); *B60L 2210/40* (2013.01); *B60L 2240/36* (2013.01);
(Continued)

(58) Field of Classification Search
USPC ....................................................... 320/108
See application file for complete search history.

(56) References Cited

U.S. PATENT DOCUMENTS

| 4,496,896 A | 1/1985 | Melocik et al. |
| 5,523,666 A | 6/1996 | Hoelzl et al. |

(Continued)

FOREIGN PATENT DOCUMENTS

| CN | 201051675 Y | 4/2008 |
| CN | 101615809 A | 12/2009 |

(Continued)

OTHER PUBLICATIONS

Office Action from U.S. Appl. No. 13/553,513, dated Jan. 21, 2015, 13 pages.

(Continued)

*Primary Examiner* — Samuel Berhanu
(74) *Attorney, Agent, or Firm* — Brooks Kushman PC; David Kelley

(57) ABSTRACT

A vehicle includes a battery and a charge plate electrically connected with the battery. The vehicle also includes a control system that causes an association signal to be repeatedly transmitted during a battery charge procedure to maintain charging of the battery via the charge plate, and in response to an object being detected in the vicinity or predicted to enter the vicinity of the charge plate, causes the transmission of the association signal to be interrupted to stop charging of the battery.

4 Claims, 5 Drawing Sheets

(51) Int. Cl.
- *B60L 3/04* (2006.01)
- *B60L 3/00* (2019.01)
- *B60L 53/36* (2019.01)
- *B60L 53/30* (2019.01)
- *B60L 53/12* (2019.01)

(52) U.S. Cl.
CPC ....... *B60L 2250/10* (2013.01); *B60L 2250/16* (2013.01); *B60L 2270/147* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 5,617,003 A * | 4/1997 | Odachi | B60L 11/182 320/108 |
| 5,850,135 A | 12/1998 | Kuki et al. | |
| 6,489,751 B2 | 12/2002 | Small et al. | |
| 6,710,546 B2 | 3/2004 | Crenshaw | |
| 8,253,387 B2 | 8/2012 | Newhouse et al. | |
| 8,872,476 B2 | 10/2014 | Huang et al. | |
| 8,946,938 B2 | 2/2015 | Kesler et al. | |
| 9,365,128 B2 | 6/2016 | Sarkar et al. | |
| 2007/0131505 A1 | 6/2007 | Kim | |
| 2008/0030171 A1 | 2/2008 | Villefrance et al. | |
| 2009/0001932 A1 * | 1/2009 | Kamijo | H02J 5/005 320/108 |
| 2009/0085522 A1 | 4/2009 | Matsumoto | |
| 2010/0001687 A1 | 1/2010 | Watanabe | |
| 2010/0013320 A1 | 1/2010 | Shiozaki et al. | |
| 2010/0065352 A1 | 3/2010 | Ichikawa | |
| 2010/0109604 A1 | 5/2010 | Boys et al. | |
| 2010/0156346 A1 | 6/2010 | Takada et al. | |
| 2010/0237709 A1 | 9/2010 | Hall et al. | |
| 2010/0253153 A1 * | 10/2010 | Kondo | H01F 27/2876 307/104 |
| 2011/0022222 A1 * | 1/2011 | Tonegawa | B60L 8/003 700/232 |
| 2011/0057612 A1 | 3/2011 | Taguchi et al. | |
| 2011/0074346 A1 | 3/2011 | Hall et al. | |
| 2011/0136550 A1 | 6/2011 | Maugars | |
| 2011/0178654 A1 | 7/2011 | Bauerle et al. | |
| 2011/0181240 A1 | 7/2011 | Baarman et al. | |
| 2011/0191186 A1 | 8/2011 | Levy et al. | |
| 2011/0193520 A1 | 8/2011 | Yamazaki et al. | |
| 2011/0221387 A1 | 9/2011 | Steigerwald et al. | |
| 2012/0038317 A1 | 2/2012 | Miyamoto et al. | |
| 2012/0056583 A1 | 3/2012 | Götz | |
| 2012/0153894 A1 | 6/2012 | Widmer | |
| 2012/0161696 A1 | 6/2012 | Cook et al. | |
| 2012/0161702 A1 | 6/2012 | Kim | |
| 2012/0187757 A1 | 7/2012 | Wechlin et al. | |
| 2012/0200151 A1 | 8/2012 | Obayashi et al. | |
| 2013/0015812 A1 | 1/2013 | Boyer et al. | |
| 2013/0141034 A1 | 6/2013 | Huang et al. | |
| 2013/0193918 A1 | 8/2013 | Sarkar et al. | |
| 2014/0021912 A1 | 1/2014 | Martin et al. | |
| 2014/0021913 A1 | 1/2014 | Martin et al. | |
| 2014/0021914 A1 | 1/2014 | Martin et al. | |

FOREIGN PATENT DOCUMENTS

| | | |
|---|---|---|
| CN | 102149566 A | 8/2011 |
| CN | 102165669 A | 8/2011 |
| CN | 102427260 A | 4/2012 |
| DE | 102011000094 A1 | 7/2012 |
| JP | 2009183105 A | 8/2009 |
| WO | 2005109597 A1 | 11/2005 |
| WO | 2009081115 A1 | 7/2009 |
| WO | 2011006876 A2 | 1/2011 |
| WO | 2013065283 A1 | 5/2013 |

OTHER PUBLICATIONS

Office Action from U.S. Appl. No. 13/553,513, dated Oct. 24, 2014, 12 pages.
Office Action from U.S. Appl. No. 13/553,465, dated Dec. 24, 2014, 12 pages.
Advisory Action from U.S. Appl. No. 13/553,513, dated Apr. 21, 2015, 4 pages.
Chinese Office Action for Chinese Application No. 201310298131.8 dated Jun. 3, 2016.
Chinese Office Action for Chinese Application No. 201310304655.3 dated May 25, 2017.
Chinese Office Action for Chinese Application No. 201310299616.9 dated Dec. 20, 2016.
Chinese Office Action for Chinese Application No. 201310304655.3 dated Mar. 10, 2017.
Chinese Office Action for Chinese Application No. 201510772187.4 dated Mar. 29, 2019.

* cited by examiner

VEHICLE BATTERY CHARGING SYSTEM AND METHOD

CROSS-REFERENCE TO RELATED APPLICATION

This application is a continuation-in-part of application Ser. No. 13/553,442, filed Jul. 19, 2012, the disclosure of which is incorporated in its entirety by reference herein.

TECHNICAL FIELD

This disclosure relates to the recharging of vehicle batteries.

BACKGROUND

Charging methods for battery electric vehicles (BEV's) and plug in hybrid electric vehicles (PHEV's) have increased in prevalence as advancements in vehicle propulsion and battery technology have occurred.

SUMMARY

A vehicle includes a battery, a charge plate electrically connected with the battery, and at least one controller. The at least one controller repeatedly transmits an association signal for a charge station during a battery charge procedure such that charging of the battery via the charge plate is maintained. And in response to an object entering a vicinity of the charge plate, the at least one controller interrupts transmission of the association signal to stop the charging.

A vehicle includes a battery, a charge plate electrically connected with the battery, and at least one controller. The at least one controller transmits an association signal to a charge system such that the charge system provides energy for the battery via the charge plate. The at least one controller also transmits a halt signal in response to an object entering a vicinity of the charge plate such that the charge system stops providing energy for the battery via the charge plate.

A method for charging a vehicle battery includes transmitting an association signal to a charge system such that the charge system provides energy for the battery via a charge plate. The method also includes outputting a detection signal in response to an object being detected within or predicted to enter a vicinity of the charge plate such that the charge system stops providing the energy, and outputting a clearance signal after the detection signal in response to the object exiting the vicinity such that the charge system resumes providing the energy.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles can be powered by battery electricity (BEVs) as well as by a combination of power sources including battery electricity. For example, hybrid electric vehicles (HEVs) are contemplated in which the powertrain is powered by both a battery and an internal combustion engine. In these configurations, the battery is rechargeable and a vehicle charger provides power to restore the battery after discharge.

Figure 1:
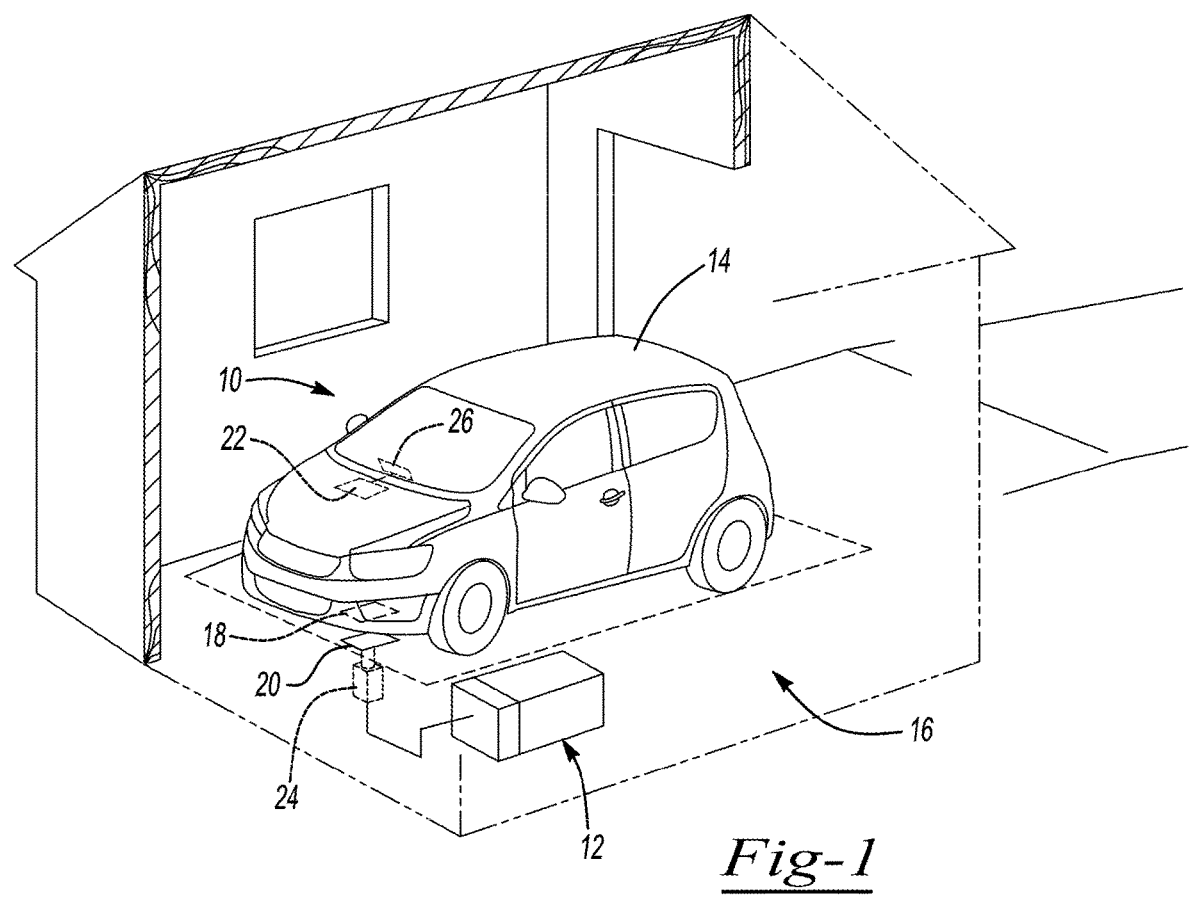
FIG. 1 is a diagrammatic view of a vehicle docked at a charging station.

With reference to FIG. 1, a vehicle charge system is illustrated in accordance with one or more embodiments and is generally referenced by numeral 10. Induction charging is used to provide power from a vehicle charger 12 to a vehicle 14 in order to restore the battery. A charging station 16 is shown accommodating the vehicle 14 to be charged through induction charging. The vehicle 14 docks at the charging station 16, which houses the vehicle charger 12. The vehicle charger 12 can be connected to receive household electrical current, such as that available within a typical home garage.

The vehicle 14 includes a secondary coil housed within an induction charge plate 18 disposed on the underside of the vehicle 14. The vehicle secondary induction charge plate 18 is electrically connected to the vehicle battery. The vehicle 14 also includes an AC to DC power converter in order to rectify and filter the AC power received from the vehicle charger 12 into DC power to be received by the battery. The vehicle charger 12 is disposed in the floor beneath the vehicle 14, and includes a primary charging coil housed within a corresponding primary induction charging plate 20. The primary induction charging plate 20 is generally horizontal and positioned at a distance from the vehicle secondary induction charge plate 18. The primary induction charging plate 20 can be articulable in height to create a suitable gap to facilitate charging of the vehicle 14. Electrical current is provided to the primary coil, which generates an electromagnetic field around the primary induction charging plate 20. When the vehicle secondary induction charge plate 18 is in proximate relation to the powered primary induction charging plate 20, it receives power by being within the generated electromagnetic field. Current is induced in the secondary coil and subsequently transferred to the vehicle battery, causing a recharging effect. The gap between the plates allows for variation in vehicle alignment, and also for accommodation of alternate authorized vehicles with differing ride heights.

In an alternative embodiment (not shown), the charging station primary induction charging plate is configured to be in a generally vertical position, for example on or near an upright wall. The vehicle would have a corresponding secondary induction charge plate on a front or rear vertical portion, for example as part of a front or rear bumper. The primary and secondary induction charging plates come into proximity when the vehicle is parked in a designated charging position. A gap would again be provided between the primary and secondary induction charge plates to facilitate variation of the parking position.

Referring back to FIG. 1, the vehicle 14 is provided with a controller 22. Although it is shown as a single controller, the vehicle controller 22 can include multiple controllers that are used to control multiple vehicle systems. For example, the vehicle controller 22 can be a vehicle system controller/powertrain control module (VSC/PCM). In this regard, the vehicle charging control portion of the VSC/PCM can be software embedded within the VSC/PCM, or it can be a separate hardware device. The vehicle controller 22 generally includes any number of microprocessors, ASICs, ICs, memory (e.g., FLASH, ROM, RAM, EPROM and/or EEPROM) and software code to co-act with one another to perform a series of operations. A microprocessor within the vehicle controller 22 further includes a timer to track elapsed time intervals between a time reference and selected events. Designated intervals are programmed such that the controller provides certain command signals and monitors given inputs at selectable time intervals. The vehicle controller is in electrical communication with the vehicle battery, and receives signals that indicate the battery charge level. The vehicle controller 22 further communicates with other controllers over a wired vehicle connection using a common bus protocol (e.g., CAN), and also employs wireless communication.

The vehicle charger 12 is provided with a charger controller 24 having wireless communication means. The charger controller 24 similarly has embedded software and is programmable to regulate power flow provided by the vehicle charger 12. Software included with the charger controller 24 also includes a timer to track elapsed time between designated events. Under selected conditions, or upon the receipt of designated instructions, the charger controller 24 can enable, disable, or reduce power flow through the charger 12. The vehicle charger 12 is configured to receive signals indicative of charge instructions from the vehicle controller 22.

The vehicle controller 22 is configured to wirelessly communicate with the charger controller 24. The wireless communication can be accomplished through RFID, NFC, Bluetooth, or other wireless methods. In at least one embodiment, said wireless communication is used to complete an association procedure between the vehicle 14, and the vehicle charger 12 prior to initiating a charge procedure. The association procedure can include the vehicle controller 22 sending a signal to the charger controller 24 indicating a request for authentication. The controller 22 then receives a response signal from the charger controller 24, and uses the response signal to determine whether or not to grant an initial authenticated status to the vehicle charger 12. Authentication can be influenced by a number of designated factors including manufacturer, power ratings, security keys, and/or other authentication factors. Based on an appropriate response signal by the charger controller 24, the vehicle controller 22 determines an affirmative association between the vehicle 14 and the vehicle charger 12. Once an authenticated charger is detected, the vehicle controller 22 provides an initiation signal to the charger controller 24 to instruct the charge system to initiate a charge procedure. The initial wireless request and subsequent authentication response make up an association "handshake" between the two devices. The association also provides for further secure communication and command signals between the vehicle 14 and the vehicle charger 12. If no affirmative authentication response is received by the vehicle controller 22, a command signal may be provided to prevent charging.

The gap between the vehicle secondary induction charge plate 18 and the primary induction charging plate 20 is susceptible to foreign objects entering into the electromagnetic field of charge. Charge management methods are disclosed herein that include the detection of a foreign object entry into a region proximate to the field of charge, and a subsequent response. At least one object sensor is disposed on the vehicle 14 or the charging station 16. A detection zone is created that encompasses an area around the pair of induction charging plates. A number of object sensors used in combination may provide a more comprehensive detection zone. Also, various sensor types are suitable for this application. In at least one embodiment, radar sensors are disposed on the vehicle 14 to monitor the region near the electromagnetic charge field. Alternatively, ultrasonic or infrared sensing techniques may be suitable for object detection purposes.

The vehicle controller 22 is configured to receive output signals from the object sensors, and uses these data to enhance instructions provided to the vehicle charger 12. The object sensors monitor the area near the induction plates for intrusion of foreign objects into the charge field. For example, if the charge plate is toroidal, the intensity of the charge field is greatest in the center of the toroid and the charge field intensity decreases in relation to the distance from the center of the toroid. A predetermined distance from the center of the toroid or charge plate can be a vicinity in which objects are detected. The object sensors are active prior to charge initiation, as well as during charge procedures. If an object is detected in the vicinity of the induction charge plate 18, a detection signal is output from the sensor indicating the presence of the object. If no object is detected in the vicinity of the induction charge plate, the sensors output a clearance signal indicative of no foreign objects near the charge plate 18. The vehicle controller 22 is configured to cause the charger controller 24 to disable the vehicle charger 12 if a detection signal is received from any of the sensors. Once charging is disabled the vehicle controller 22 reactivates the object sensors to continue monitoring the area near the induction plates. If a subsequent clearance signal is received from all of the sensors, the vehicle controller 22 is programmable to cause the transmission of a resumption signal to the charger controller 24. The resumption signal indicates an instruction to resume the battery charge procedure previously disabled by object detection.

The vehicle charger 12 may be configured to require a repeated transmission of a signal from the vehicle 14 to preserve an affirmative association and maintain an ongoing charge procedure. The vehicle controller 22 can cause the association signal to be transmitted intermittently, or transmitted continuously. In at least one embodiment, the repeated transmission of the association signal occurs at predetermined time intervals. The initiation and/or conclusion of the association signal can also be triggered by charging related events, for example such as designated threshold battery charge levels, or predetermined cumulative energy thresholds delivered by the vehicle charger. The charger controller 24 is programmable to disable the primary induction charging plate 20 if no signal is received from the vehicle within designated time intervals. As described above, the charging system is configured to disable charging when an object is detected near the vehicle secondary induction charge plate 18. It is suitable to utilize the requirement of ongoing association signals as a means to disable charging when a foreign object is detected near the charge field. In at least one embodiment, the vehicle controller 22 is configured to interrupt the repeated transmission of association signals to the vehicle charger 12 in response to a detection signal output from any of the sensors. Interruption of the association signal causes the power supply to the primary induction charge plate 20 to be shut off. Current provided to the battery via the charge plate 18 is thereby reduced to zero. A redundant termination signal can be additionally provided to disable the vehicle charger 12.

Once an object has cleared the vicinity of the charge plate and is no longer detected, the charging system 10 is configured to resume a disabled charge procedure. The association signals can again be used as a means to control the charge procedures conducted by the vehicle charger 12. As mentioned above, the object sensors remain active during an interruption of association signals. Once a foreign object is no longer detected, a clearance signal is output from the sensors. The vehicle controller 22 causes the resumption of the transmission of the repeated association signals in response to the clearance signal from the sensors. The vehicle charger 12 is thereby prompted to resume charging of the battery via the induction charge plate 20. An affirmative charge resumption signal can also be provided to command the vehicle charger 12 to resume a disabled charge procedure. If more than a predetermined time period has elapsed, the charging system can undergo the initial wireless association between the vehicle 14 and the charger 12 in order to begin a new charge procedure.

The vehicle controller 22 may be further configured to cause the generation of a plurality of alert signals. Referring to FIG. 1, the vehicle 14 is provided with a user display 26 inside the passenger compartment. The user display 26 serves as an alert mechanism to an operator. The controller 22 can cause the generation of a number of different in-vehicle display messages. For example, display alerts are generated that notify an operator of a detected object and/or the disablement of a charge procedure. The vehicle horn is an additional alert mechanism capable of providing an external audible alert signal in response to a detected object proximate to the field of charge. The horn alert pulse duration and repetition pattern may be set to be unique to distinguish obstacle detection events from other events which cause horn pulses.

Figure 2:
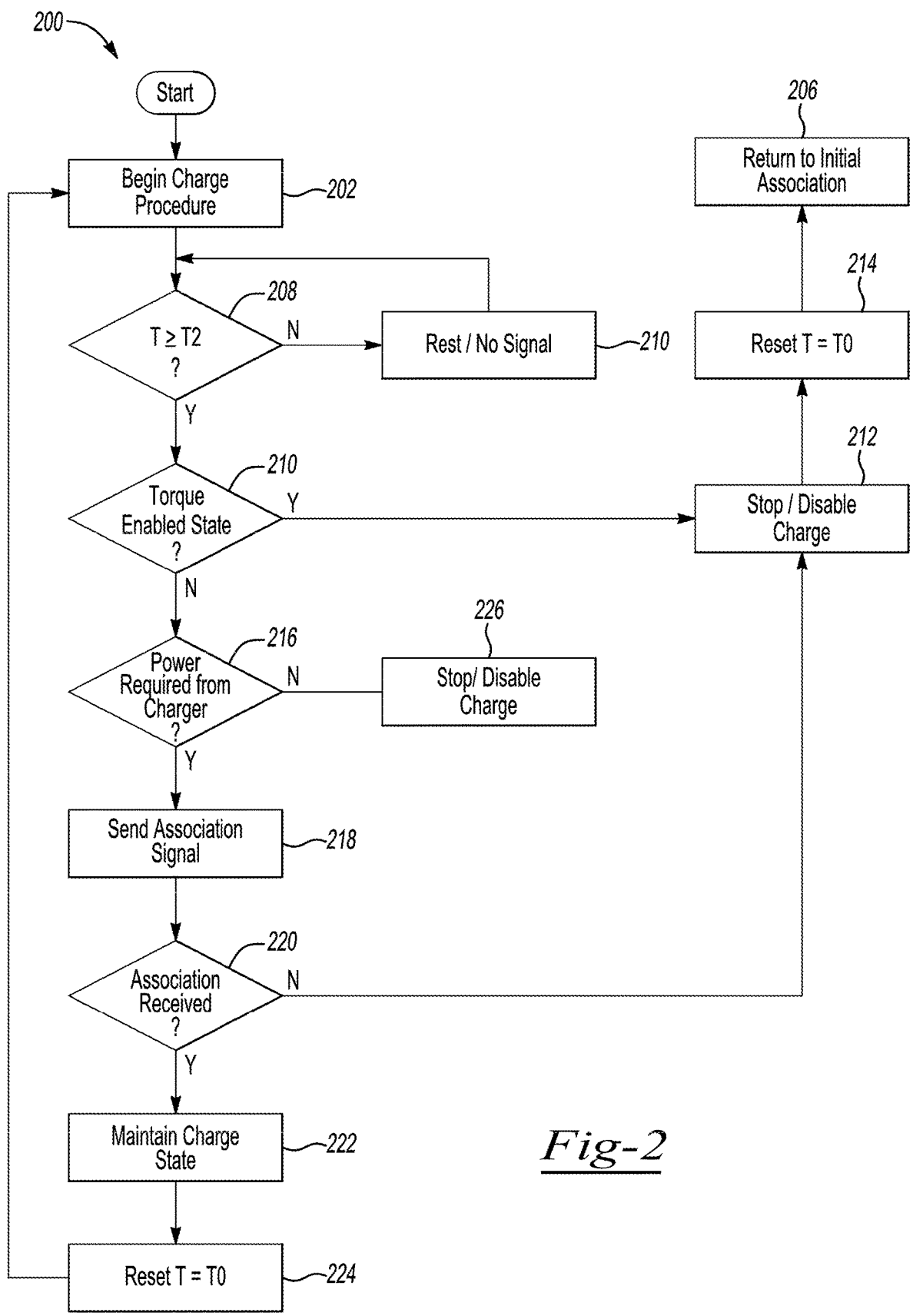
FIG. 2 is a flow chart of an algorithm for performing an ongoing wireless association between a vehicle and a vehicle charger.

A method depicting an algorithm of an ongoing association procedure is illustrated in FIG. 2 generally as method 200. The vehicle controller begins a charge procedure in step 202, for example after an initial association between the vehicle and the vehicle charger has been achieved. The vehicle controller then determines in step 208 whether the designated time interval T2 has elapsed between the current time and the initial time reference T0. If not, the controller remains in a rest state in step 210 and provides no command signal to the charger pertaining to vehicle charging. The controller then returns to step 208 to re-consider the current time elapsed from the time reference T0 relative to the designated time interval T2. It should be appreciated that the time interval T2 can be short enough to approximate a continuous association between the vehicle and the charger.

Once the designated time interval T2 has elapsed, the vehicle controller determines in step 210 whether the vehicle is in a torque enabled state. If the vehicle is torque enabled, the vehicle controller may provide in step 212 a signal indicative of a command to stop or disable the vehicle charger. The controller would then reset the timer in step 214 to the time reference T0, and subsequently return in step 206 to an initial association procedure. Although this embodiment is for a stationary charge station, this can be applied to inductive highway charging where the vehicle is charged while in motion by energized inductive charge coils in the roadway in which the vehicle would absorb energy from the field generated by the roadway inductive coils as it travels over the coils.

If the vehicle is not torque enabled, for example in a parked state in step 210, the vehicle controller then determines in step 216 whether the vehicle requires power from the charger. If the vehicle battery charge level exceeds a designated threshold, and if there is no need to power other vehicle activities while docked at the charging station, the vehicle controller provides in step 226 a signal indicative of a command to disable the vehicle charger. It should be appreciated that the threshold charge level of the ongoing association procedure may or may not be the same level as a battery threshold required to initially begin a charge procedure.

If the battery charge level is less than the designated threshold charge level, or the vehicle requires power from the charger to facilitate vehicle activities in step 216, the vehicle controller causes in step 218 an association signal to be transmitted to the vehicle charger. The association signal transmitted in step 218 reaffirms any prior association, and maintains a given charge procedure. If the signal is not received by the vehicle charger in step 220, either the vehicle controller or the charger controller can be configured to discontinue charging in step 212 since the time interval T2 has elapsed and no signal affirming association has been received. The controller(s) would then reset the timer in step 214 to the time reference T0, and subsequently return in step 206 to an initial association procedure.

Once the vehicle charger receives the association signal in step 220, continuance of the charge procedure is enabled and the charge state is maintained in step 222. The controller(s) then resets the timer in step 224, and return to step 202. Depending on the duration of T2, the association signal can be considered to be transmitted either periodically or continuously as the vehicle controller cycles through method 200.

Figure 3:
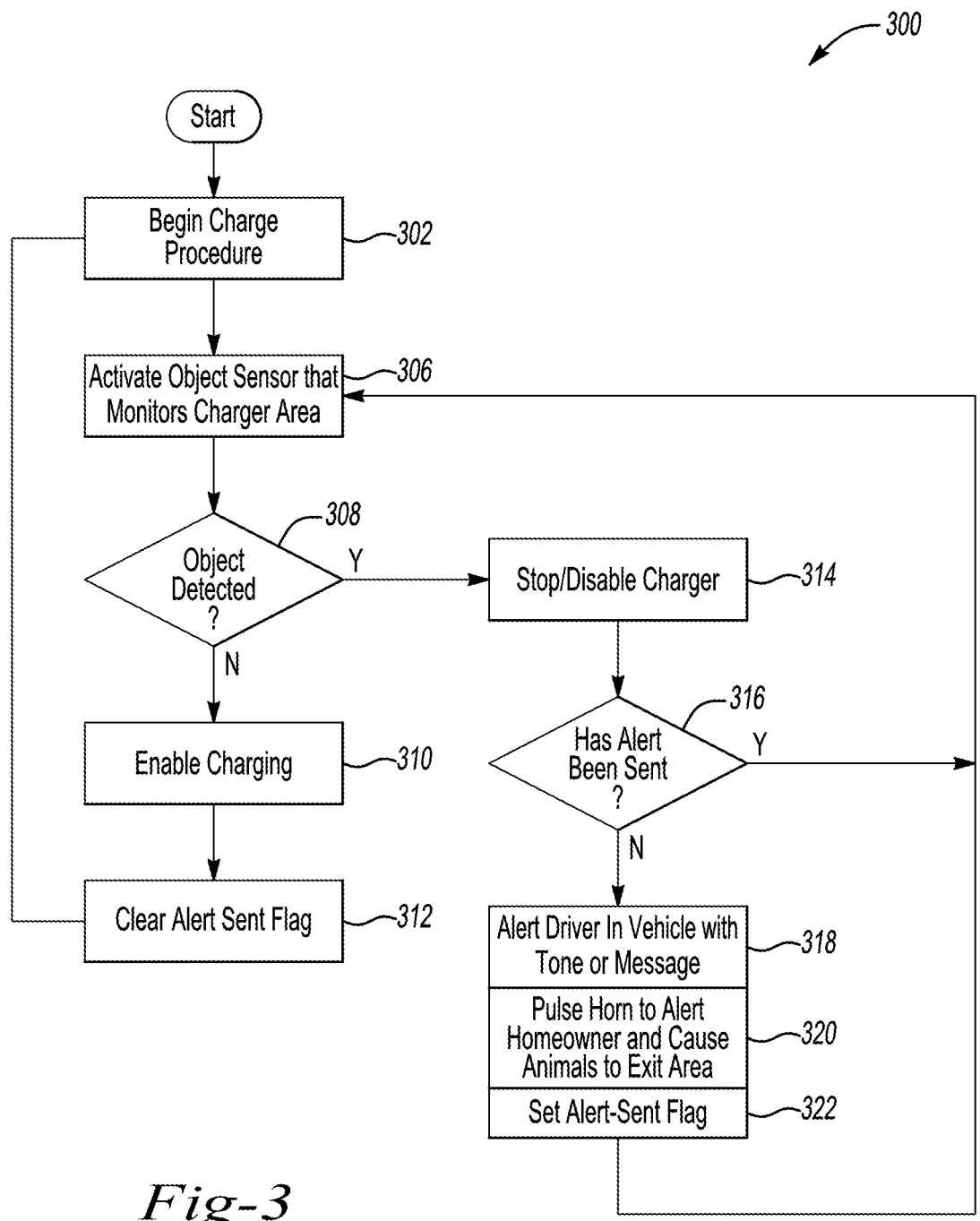
FIG. 3 is a flow chart of an algorithm for managing inductive charging including the detection of foreign objects near the charging area.

As illustrated in FIG. 3, a method 300 performed by a vehicle controller determines whether to enable or disable vehicle charging based at least in part on whether a foreign object is within proximity of the charge field. The vehicle controller begins a charge procedure in step 302. An association request and affirmative response as discussed above can be required to enable selection of the charge procedure. Having a battery with less than a full charge while in proximity to an associated charging station can induce the selection of a charging state. The vehicle controller causes the activation of the object sensors in step 306 to monitor the area surrounding the induction charging plates. Once active, the object sensors output signals indicative of an object detection status to the vehicle controller. In step 308, the vehicle controller uses data received from object sensors to determine whether a foreign object is in proximity to the field of charge. If no object has been detected, the vehicle controller causes, in step 310, the transmission of a command signal enabling the vehicle charger to begin providing power. The vehicle controller also clears any alert flags in step 312 which may have been stored in the memory related to a prior detected object occurrence. The controller then returns to steps 302 and 306 to resume object detection.

Again referring to FIG. 3, if an object has been detected by the object sensors in step 308, the vehicle controller causes, in step 314, the charger to be disabled from providing power. If a battery charge procedure is already underway, step 314 includes interrupting the procedure in response to an object detection signal. As discussed above, the interruption of the battery charge procedure may be caused by either an affirmative termination command, or by a suspension of the transmission of the repeated association signal. The suspension of the repeated transmission of the association signal causes the vehicle and the charger to lose association, and charging of the battery to discontinue. If a charge procedure has not yet begun, step 314 includes providing a signal indicative of a command to prevent charge initiation.

In step 316, the vehicle controller determines whether a prior alert has been sent to a vehicle operator indicating the detection of an object and the disablement of vehicle charging. A prior alert is indicated by an alert-sent flag stored within the memory of the controller. If a prior alert has been sent, the controller returns to step 306 and reactivates the object sensors to detect whether the foreign object is still near the charge field. However, if no prior alert has been sent, an alert is generated in response to an object being detected in steps 318 and 320. The alert can be audible, as shown in step 318, in the form of a vehicle horn pulse. The external horn pulse can have a distinct duration and/or repetition pattern so as to notify an operator that is away from the vehicle. The vehicle horn pulse may further cause an animal near the charge field to leave the area. The alert may also include a text message sent to an operator's mobile communication device. An in-vehicle alert is provided as shown in step 320 to notify an operator inside the vehicle. Display messages and audible tones notify a driver that an object has been detected near the charge field. After providing an operator alert, the vehicle controller sets an internal alert-sent flag in step 322 so as to store an indication that notice was provided to the operator. The controller then returns to step 306 and causes activation of the object sensors. In this way, a reassessment of the field of charge is conducted, and step 308 can allow charging to resume if the detected object is no longer near the field of charge.

In alternative embodiments the vehicle controller may be configured to open a switch within a vehicle circuit connected to the secondary coil, so as to disable further vehicle charging.

Figure 4:
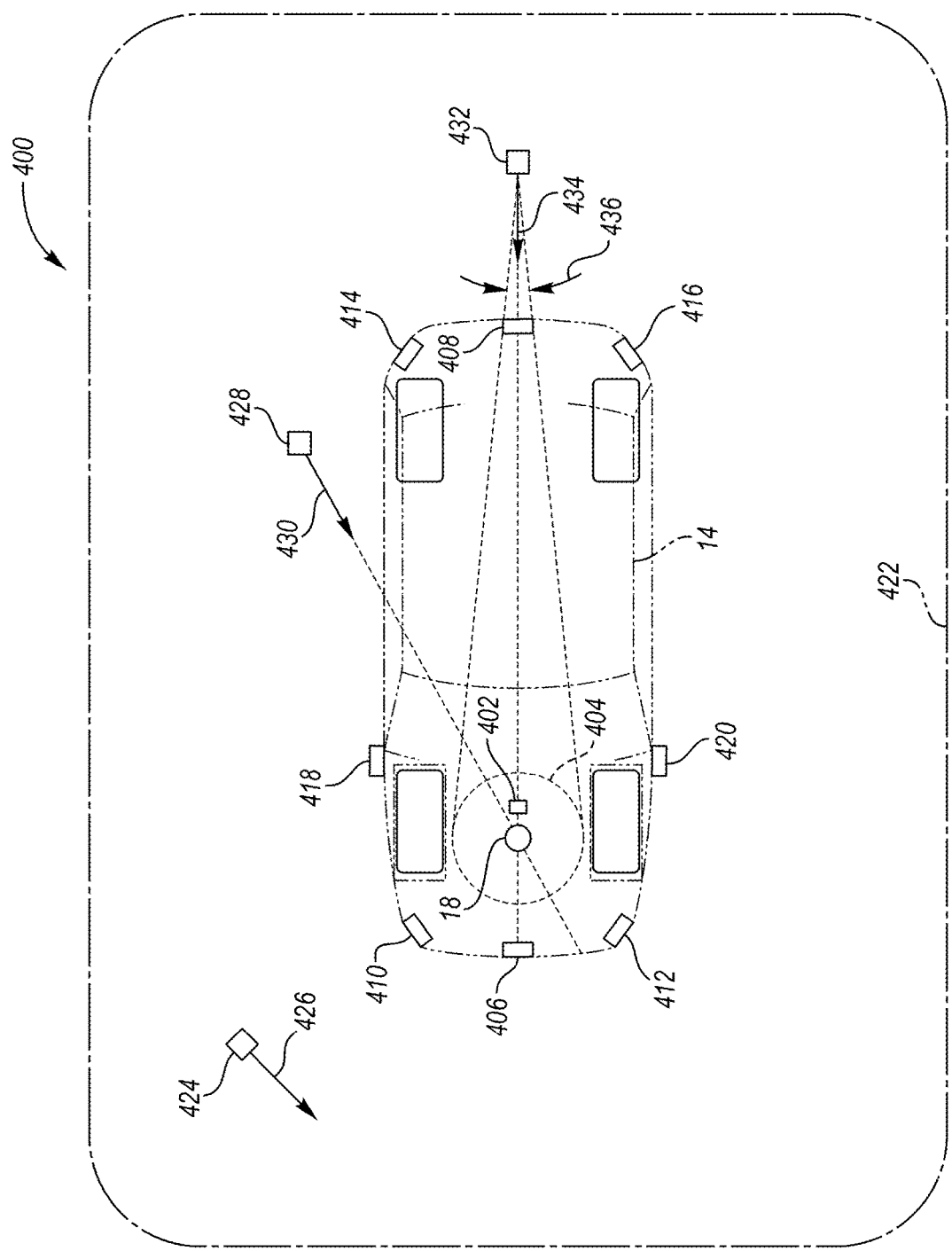
FIG. 4 is a plan diagrammatic view of vehicle sensor zones.

FIG. 4 is an overhead diagrammatic view of vehicle sensor zones 400. The vehicle 14 includes a secondary coil housed within the induction charge plate 18 disposed on the underside of the vehicle 14. A sensor 402 may be disposed on the underside of vehicle 14 which can be of a variety of sensor types including but not limited to ultrasonic, Light Detection and Ranging (LIDAR), Radio Detection and Ranging (RADAR), microwave, Infrared (IR) and vision. The sensor type may be configured to detect multiple object characteristics including but not limited to size, mass, temperature, density, metallic properties, Radio Frequency (RF) absorption and magnetic susceptibility. A RF sensor transmits RF energy at a predetermined frequency or frequencies; the RF energy is either reflected or absorbed by an object in the path of the RF energy transmission. The RF susceptibility of the object includes the RF and magnetic absorption properties of the object. The energy transmitted by a sensor when absorbed by an object may change the temperature of the object based on the energy absorbed. The change in temperature may be determined by a sensor including but not limited to an IR sensor. Based on the type of energy transmitted by the sensor and the change in temperature of the object, a classification or sensitivity of the object to RF or magnetic properties can be determined. This sensitivity may be directly or indirectly related to the electro-magnetic field sensitivity of the object. Sensor 402 may be a single sensor or multiple sensors disposed at a single location or at different locations on the vehicle 14. Sensor 402 can be specifically adapted for the detection of objects regarding the operation the induction charge plate 18. Generally, a detection zone 404 around the induction charge plate 18 is used to detect stationary objects within the flux field of the induction charge plate 18 and, in the event of an object being detected, to collapse the field of the charge plate 18. The detection zone is limited to the range of the sensors.

Modern vehicles have multiple sensors used to assist the driver in vehicle operation and to provide safety while the vehicle is in operation. These sensors include but are not limited to a frontal forward facing sensor 406, a rear backward facing sensor 408, frontal side mounted sensors 410 and 412, rear side mounted sensors 414 and 416, along with lateral facing side mounted sensors 418 and 420. These sensors may have a variety of different uses including parking assistance, adaptive cruise control, side impact detection, collision avoidance blind spot detection, cross traffic detection and land change assistance with the capabilities including long range (>75 meters), medium range (15-75 meters) and short range (<15 meters). These sensors (406, 408, 410, 412, 414, 416, 418, and 420) alone or in conjunction with the sensors dedicated to the inductive charging 402 can be used to detect a larger area 422. Due to the larger range, it may be necessary to process the information from these sensors based on object characteristics and relative motion. In this area, an object 424 may be detected along with a direction 426 that the object 424 is traveling. In the event that the object 424 is not predicted to travel in the direction 426 which intersects the inductive charge zone 404, it may nevertheless be continually monitored. Also, sensor information can be used to determine if an object 428 may travel in a direction 430 which is predicted to intersect the inductive charge plate 18 at some point in time. In the event that the object 428 is predicted to travel in the direction 430 to intersect the inductive charge plate 18, the field of charge plate 18 can be deactivated so the field can be collapsed prior to the object entering the inductive charge zone 404. Also, an object 432 may travel in a direction 434 which is in a range 436 predicted to intersect the inductive charge zone 404 at some point in time. This variance in direction may account for environmental conditions including but not limited to wind or ground slope in determining the predicted trajectory 434. In the event that the object 432 is predicted to intersect the inductive charge plate 18, the field of the charge plate 18 can be deactivated so the field can be collapsed prior to the object entering the inductive charge zone 404.

Figure 5:
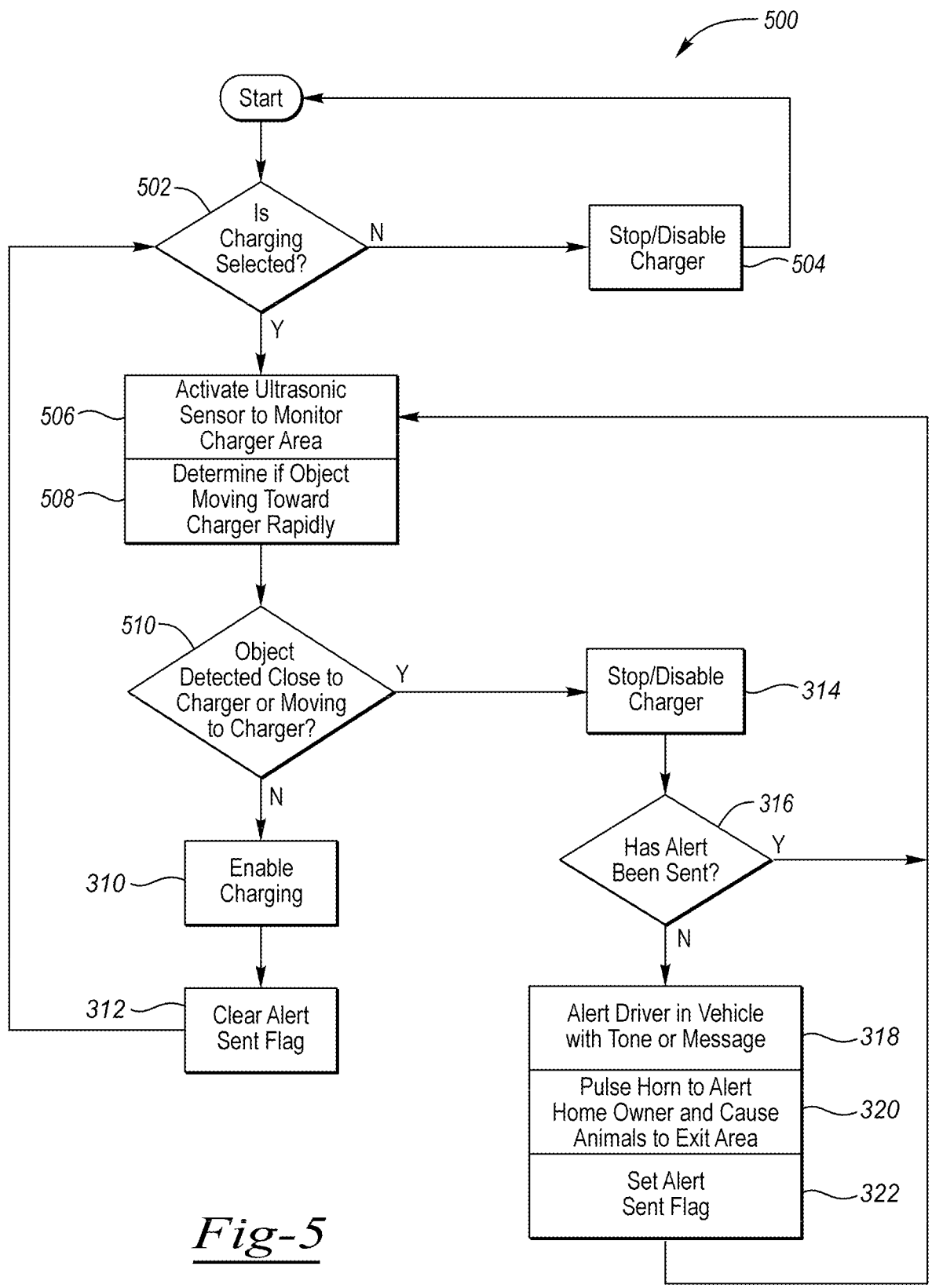
FIG. 5 is a flow chart of an algorithm for performing an ongoing wireless association between a vehicle and a vehicle charger based on the motion of objects within a sensor zone.

FIG. 5 is a flow chart of a method 500 whereby a vehicle controller determines whether to enable or disable vehicle charging based at least in part, on whether a foreign object is traveling in a direction predicted to enter into the inductive charge zone 404 or intersect with the inductive charge plate 18. The vehicle controller begins a charge procedure in step 502. An association request and affirmative response as discussed above may be required to enable selection of the charge procedure. Having a battery with less than a full charge while in proximity to an associated charging station can induce the selection of a charging state. The vehicle controller causes the activation of the object sensors in step 506 to monitor the area surrounding the induction charging plate 18. Once active, the object sensors output signals indicative of objects detected by the sensors for post processing. In step 508, the vehicle controller uses data received from object sensors to determine the object's trajectory prediction, including if that trajectory will intersect the charge plate 18 or enter into the inductive charge zone 404. Step 510 determines if no object has been detected or if an object is predicted to intersect charge plate 18 or enter the inductive charge zone 404. If no object is determined to be within or enter into the inductive charge zone 404, the vehicle controller causes the transmission of a command signal enabling the vehicle charger to provide power. The vehicle controller also clears any alert-sent flags in step 312 which may have been stored in the memory related to a prior detected object occurrence. The controller then returns to steps 502 and 506 to resume object detection.

Again referring to FIG. 5, if an object has been detected to either be within the inductive charge zone 404 or predicted to enter the inductive charge zone 404 in step 308, the vehicle controller causes, in step 314, the charger to be disabled from providing power. The distance the sensors scan for object trajectory can vary based on implementation and duration of time needed to collapse the charge plate field. For example, a field that requires one second to collapse may utilize a 15 foot or five meter scan zone 422 so that the field will be collapsed in the event of a 30 mph object predicted to intersect or enter the inductive charge zone. If a battery charge procedure is already underway, step 314 includes interrupting the procedure in response to a predictive object detection signal. As previously described, transmitting an affirmative termination command or suspending transmission of the repeated association signal may interrupt the battery charge procedure. The suspension of the repeated transmission of the association signal causes the vehicle and the charger to lose association, and charging of the battery to discontinue. If a charge procedure has not yet begun, step 314 includes providing a signal indicative of a command to prevent charge initiation.

In step 316, the vehicle controller determines whether a prior alert has been sent to a vehicle operator indicating the detection of an object and the disablement of vehicle charging. A prior alert is indicated by an alert-sent flag stored within the memory of the controller. If a prior alert has been sent, the controller returns to step 506 and reactivates the object sensors to detect whether the foreign object is still near the charge field. However, if no prior alert has been sent, an alert is generated in response to an object being detected in steps 318 and 320. The alert can be audible, as shown in step 318, in the form of a vehicle horn pulse. The external horn pulse can have a distinct duration and/or repetition pattern so as to notify an operator that is away from the vehicle. The vehicle horn pulse may further cause an animal near the charge field to leave the area. The alert may also include a text message sent to an operator's mobile communication device. An in-vehicle alert is provided as shown in step 320 to notify an operator inside the vehicle. Display messages and audible tones notify a driver that an object has been detected near the charge field. After providing an operator alert, the vehicle controller sets an internal alert-sent flag in step 322 so as to store an indication that notice was provided to the operator. The controller then returns to step 506 and causes activation of the object sensors. In this way, a reassessment of the field of charge is conducted, and step 508 can allow charging to resume if the detected object is no longer near the field of charge.

In the event that the charging is occurring during highway charging, the algorithm may alert the driver as in step 318, and then bypass step 320.

One advantage of the above methods is to provide sensing which helps prevent harm to foreign objects which may enter or are predicted to enter the electromagnetic field of induction charging. An additional beneficial aspect is the method of continuous monitoring after a detected object, combined with resumption of a charge procedure if the detected object becomes clear of the charge field. For example, an object may transiently pass through the field. Detection of the object would cause an interruption of a charge procedure. The above described methods avoid a long term interruption caused by a temporary object detection causing vehicle charging to remain incomplete. A transient detection event would not necessarily cause an operator to return to a vehicle that is less than fully charged.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for charging a vehicle battery comprising:
wirelessly transmitting an association signal from a vehicle to a charge system such that the charge system provides energy for the battery via a charge plate only while periodically receiving the association signal;
outputting a detection signal in response to an object being detected within or predicted to enter a vicinity of the charge plate and inhibiting the wirelessly transmitting of the association signal in response such that the charge system stops providing the energy; and
outputting a clearance signal after the detection signal in response to the object exiting the vicinity and resuming the transmitting of the association signal such that the charge system resumes providing the energy.

2. The method of claim 1, wherein the vicinity of the charge plate is defined by a perimeter of the charge plate.

3. The method of claim 1, wherein the prediction is based on wind or ground slope near the vicinity.

4. The method of claim 1, wherein the detection signal includes data indicative of a sensitivity of the object to the energy.

* * * * *